United States Patent
Somes

(10) Patent No.: US 8,004,228 B2
(45) Date of Patent: Aug. 23, 2011

(54) ROBOTIC MANIPULATOR USING ROTARY DRIVES

(76) Inventor: Steven D. Somes, Kirtland, OH (US)

( * ) Notice: Subject to any disclaimer, the term of this patent is extended or adjusted under 35 U.S.C. 154(b) by 574 days.

(21) Appl. No.: 12/117,394

(22) Filed: May 8, 2008

(65) Prior Publication Data

US 2008/0278105 A1     Nov. 13, 2008

Related U.S. Application Data

(60) Provisional application No. 60/917,079, filed on May 10, 2007.

(51) Int. Cl.
   *B25J 9/12* (2006.01)
(52) U.S. Cl. ..................... 318/568.11; 901/15
(58) Field of Classification Search .................. 318/567, 318/568.1, 568.11; 901/14, 15, 27, 28
   See application file for complete search history.

(56) References Cited

U.S. PATENT DOCUMENTS

| | | |
|---|---|---|
| 3,534,634 A | 10/1970 | Shunpei Kawanami |
| 4,188,837 A | 2/1980 | Bendall |
| 4,419,041 A | 12/1983 | Rose |
| 4,557,662 A | 12/1985 | Terauchi et al. |
| 4,620,831 A | 11/1986 | Poncet et al. |
| RE32,414 E | 5/1987 | Hutchins et al. |
| 4,784,010 A | 11/1988 | Wood et al. |
| 4,896,809 A | 1/1990 | Koyanagi |
| 5,046,375 A | 9/1991 | Salisbury, Jr. et al. |
| 5,105,672 A | 4/1992 | Carson et al. |
| 5,162,713 A | 11/1992 | Mohri et al. |
| 5,429,015 A | 7/1995 | Somes |
| 5,553,509 A | 9/1996 | Somes |
| 5,584,647 A * | 12/1996 | Uehara et al. ............... 414/744.5 |
| 5,944,476 A * | 8/1999 | Bacchi et al. ............... 414/783 |
| 6,105,454 A * | 8/2000 | Bacchi et al. ............... 74/490.03 |
| 6,781,337 B2 * | 8/2004 | Sakamoto et al. ............ 318/567 |
| 6,791,291 B2 * | 9/2004 | Shimizu et al. ............. 318/568.1 |
| 2004/0250644 A1 | 12/2004 | Gosselin et al. |

FOREIGN PATENT DOCUMENTS

| | | |
|---|---|---|
| EP | 0 364 269 | 4/1990 |
| FR | 2 832 345 | 5/2003 |
| GB | 903602 | 8/1962 |
| JP | 0297327 | 11/1989 |
| SU | 1677422 | 9/1991 |

OTHER PUBLICATIONS

Written Opinion of the International Searching Authority from corresponding Application No. PCT/US2008/063061 mailed May 6, 2009.
International Preliminary Report on Patentability from corresponding Application No. PCT/US2008/063061 mailed Aug. 4, 2009.
International Search Report and the Written Opinion from corresponding Application No. PCT/US2008/063061 mailed Sep. 15, 2008.

* cited by examiner

*Primary Examiner* — Bentsu Ro
(74) *Attorney, Agent, or Firm* — Renner, Otto, Boisselle & Sklar, LLP

(57) ABSTRACT

A two degree-of-freedom positioning and manipulating apparatus is provided. The apparatus includes a first driven member rotatable about a first driven axis, a first driver member coupled to a first driven member for rotating the first driven member about the first driven axis, and a link member fixedly connected to the first driven member. The apparatus further includes a second driven member rotatably mounted to the link member for rotating about a second driven axis, with the second driven axis generally parallel to the first driven axis, and a second driver member coupled at a drive point to the second driven member for rotating the second driven member about the second driven axis. The drive point is generally coincident with the first driven axis.

22 Claims, 5 Drawing Sheets

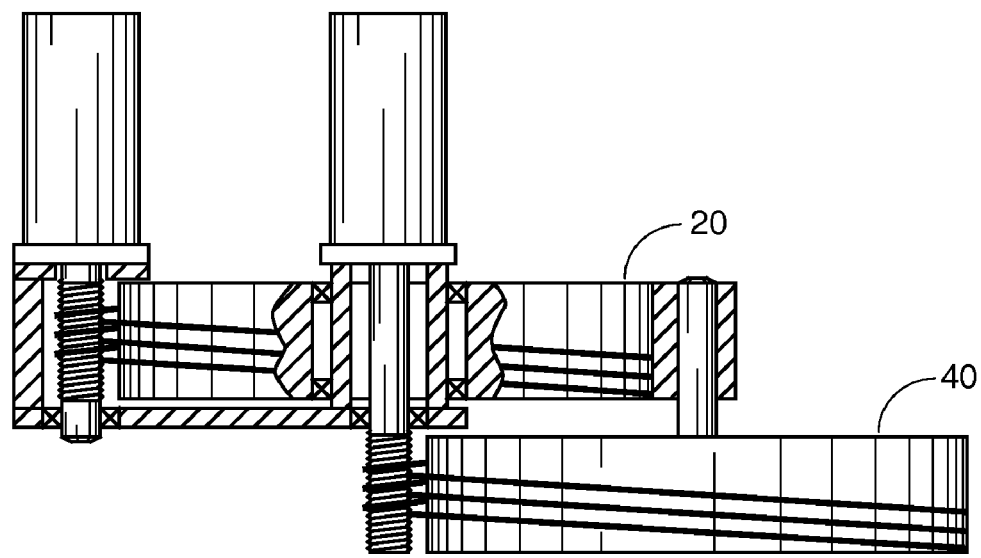
FIG. 1: PRIOR ART
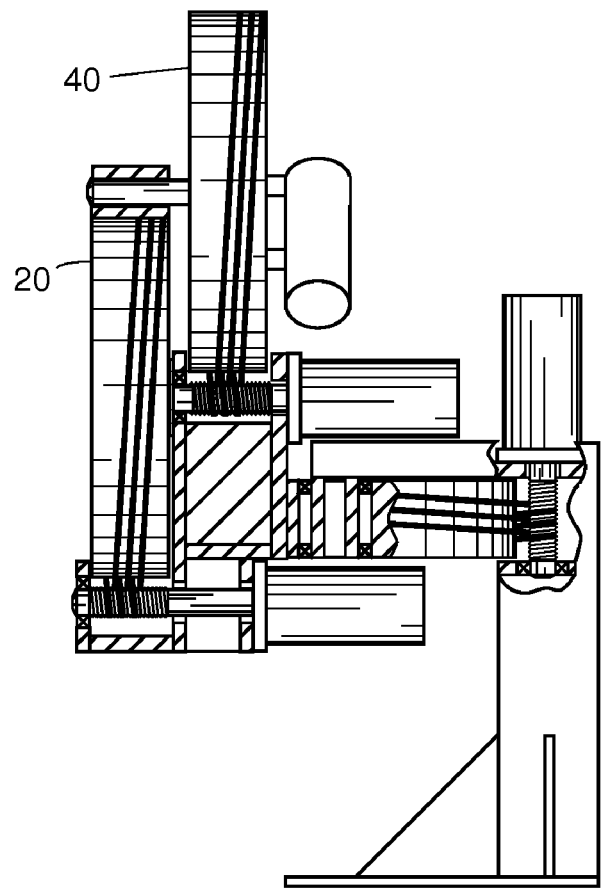
FIG. 2 PRIOR ART

SECTION A-A

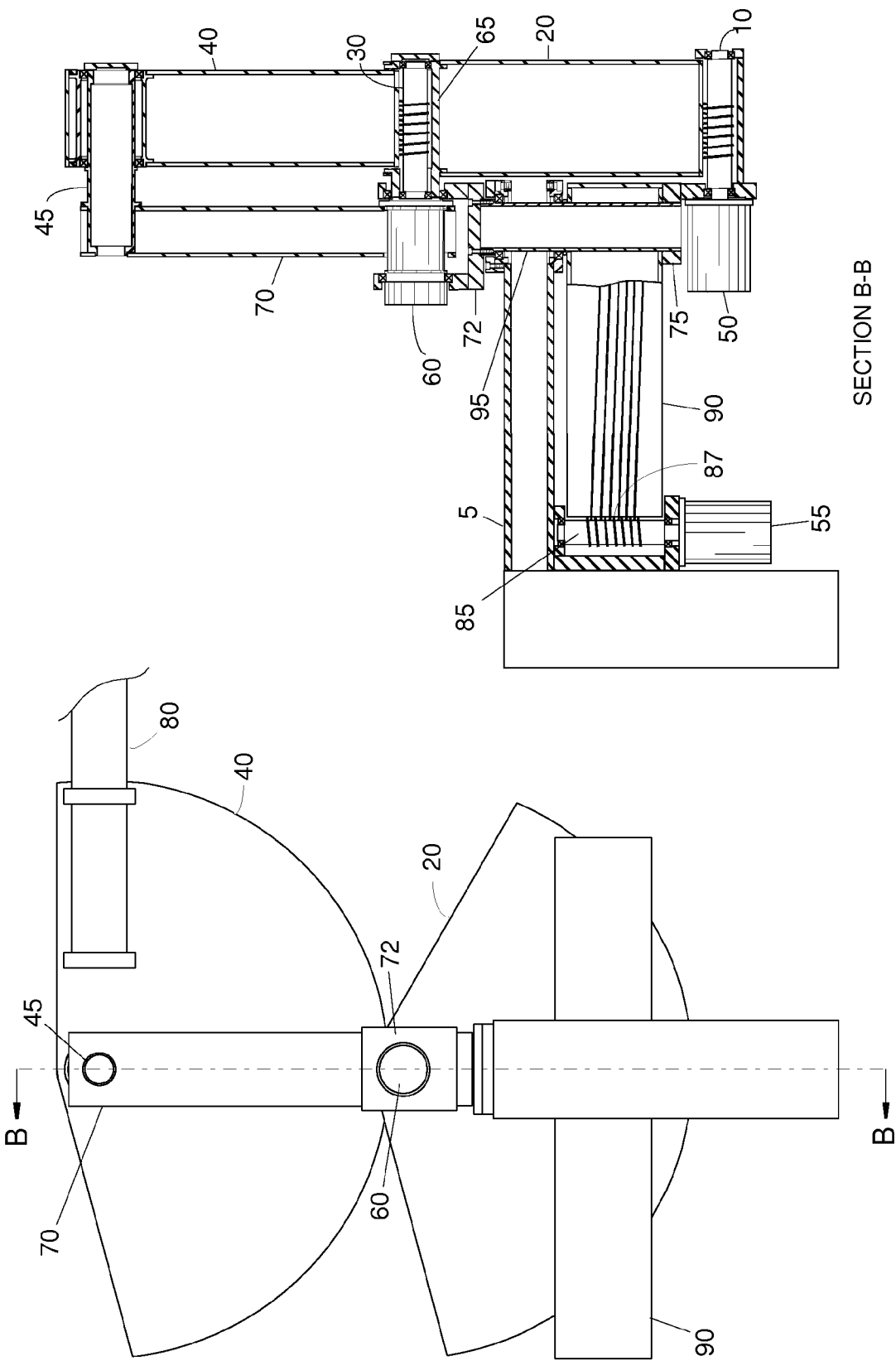

ROBOTIC MANIPULATOR USING ROTARY DRIVES

CROSS REFERENCE TO RELATED APPLICATION

This application claims priority under 35 U.S.C. §119 to U.S. Provisional Application No. 60/917,079, filed May 10, 2007, the entire disclosure of which is incorporated herein by reference.

TECHNICAL FIELD OF THE INVENTION

The present invention relates to a two (2) degree-of-freedom positioning and manipulating apparatus as well as its extension to three (3) degrees of freedom. More particularly, the present invention relates to both a 2 and 3 degree-of-freedom manipulating apparatus constructed from rotary drives.

DESCRIPTION OF THE RELATED ART

U.S. Pat. Nos. 5,429,015 and 5,553,509, the entire disclosures of which are incorporated herein by reference, describe 2 and 3 degree-of-freedom manipulators constructed from rotary drives that realize lower mass, inertia, friction, and joint roughness compared to other designs. FIG. 1. shows the 2 degree-of-freedom configuration as described in the '015 patent. Such configuration features a scarcity of components, as rotary drives of the style employed are easy to fabricate with a minimum of parts. Plus, no auxiliary power transmission components are required to deliver power from the stationary motor to the second link in the serial chain. The rotary drives can turn very smoothly, and since the moving members do not have to carry the mass of the motors, they can be made light and stiff. The low friction, low inertia, and smooth actuation make a 2 degree-of-freedom manipulator that is fast, accurate, and economical to construct.

FIG. 2 illustrates an apparatus having 3 degrees-of-freedom as described in the '509 patent. The apparatus maintains the ideals of simplicity and low friction and inertia by mounting the 2 degree-of-freedom configuration perpendicularly to a third rotary drive. The drive motors, which are by far the most massive components of the 2 degree-of-freedom manipulator, are located along the third drive's rotational axis to minimize their inertia penalty.

For compliant environmental interaction of the manipulator with its environment, as required in close fitting assembly or surface finishing, it is important that the manipulator control its end-effector with low inertia and low resistance. Thus, there is a strong need in the art for multiple degree-of-freedom manipulators with reduced friction, inertia, mass, etc.

SUMMARY OF THE INVENTION

The present invention addresses the aforementioned shortcomings by providing 2 and 3 degree-of-freedom manipulators capable of fast and accurate motion and that are dynamically responsive to external forces applied at the end-effector.

More particularly, the present invention serves to reduce the number and size of components, increase structural stiffness, reduce inertia of the moving members, and reduce needed motor torque.

A two degree-of-freedom robotic manipulator is constructed principally from rotary drives. The rotary drive consists of a relatively small diameter cylindrical driving member coupled to a larger diameter cylindrical driven member. Since only partial rotation of the driven member is required, it can be constructed as a partial circular sector, allowing a second rotary drive to be mounted offset parallel from the first via a connecting link. The driving member of the second drive is located with its axis of rotation coincident with the axis of rotation of the driven member of the first drive.

This arrangement reduces the mass and inertia of the moving members, producing higher performance. In a vertical arrangement, with the second driven member directly above the first driven member, the first driven member acts as a partial counterweight to the second driven member, reducing needed motor torque. The manipulator is more compact, more structurally rigid, and has less mass and inertia for higher performance than previous designs.

The 2 degree-of-freedom manipulator can be extended to 3 degrees-of-freedom by mounting it perpendicularly to an additional rotary driven member. Motors powering the 2 degree-of-freedom mechanism are mounted with their centers of mass roughly along the perpendicular rotational axis. The center of mass of the 2 degree-of-freedom mechanism is also located close to the perpendicular rotating axis. The manipulator is more compact, more structurally rigid, and has less mass and inertia to realize higher performance.

Owing to the low friction and inertia of the moving members, the apparatus can be manually positioned in order to contact the end-effector with desired measurement points. The position of the point is then calculated by examining the joint positions. This type of device is commonly known as a Coordinate Measuring Machine (CMM), and its functionality can be achieved by locating angular measurement sensors in place of the motors.

According to an aspect of the invention, a two degree-of-freedom positioning and manipulating apparatus is provided. The apparatus includes a first driven member rotatable about a first driven axis, a first driver member coupled to a first driven member for rotating the first driven member about the first driven axis, and a link member fixedly connected to the first driven member. The apparatus further includes a second driven member rotatably mounted to the link member for rotating about a second driven axis, with the second driven axis generally parallel to the first driven axis, and a second driver member coupled at a drive point to the second driven member for rotating the second driven member about the second driven axis. The drive point is generally coincident with the first driven axis.

According to another aspect, the first driven member is a sector of a generally cylindrical body, and the second driven member includes a generally cylindrical body or sector thereof.

According to another aspect, the first driven axis and the second driven axis are offset and generally parallel.

In accordance with another aspect, the first and second driver members each receive a respective rotary input from a respective mechanical rotary power source.

In accordance with still another aspect, the apparatus includes a fixed reference frame, and the first mechanical rotary power source is mounted stationary to the fixed reference frame.

According to still another aspect, the second mechanical rotary power source is mounted stationary relative to the rotation of the first driven member.

According to yet another aspect, the rotating component of the second mechanical rotary power source is rotatably mounted to the fixed reference frame relative to the rotation of the first driven member.

In accordance with another aspect, the apparatus includes an arm fixedly secured to the second driven member.

According to another aspect, the first driver member is coupled to the first driven member by a first cable means and the second driver member is coupled to the second driven member by a second cable means.

In accordance with another aspect, the first and second driver members each receive a respective rotary input from a respective mechanical rotary power source.

According to another aspect, the apparatus includes a fixed reference frame, and wherein a rotating component of each mechanical rotary power source is rotatably mounted to the fixed reference frame relative to the rotation of the first driven member.

According to another aspect, a two degree-of-freedom measuring apparatus is provided. The apparatus includes a first rotary drive having a generally cylindrical first driven member and a generally cylindrical sector first driver member, the first driver member being rotatable about a first driver axis and coupled to the first driven member whereby rotation of the first driver member rotates the first driven member about a first driven axis, the first driver axis and the first driven axis being generally parallel. The apparatus further includes a second rotary drive having a generally cylindrical second driven member and a second driver member shaped generally as a cylinder or sector thereof, the second driver member being rotatable about a second driver axis and coupled to the second driven member whereby rotation of the second driver member rotates the second driven member about a second driven axis, the second driver axis and the second driven axis being generally parallel. The second driver member is rotatably mounted to a link fixed to the first driver member for rotation about the second driver axis, the first driver axis and the second driver axis being offset and generally parallel, and the second driven axis being generally coincident with the first driver axis. The apparatus also includes a first measuring means coupled to the first driven member, and a second measuring means coupled to the second driven member.

According to another aspect, a three degree-of-freedom positioning and manipulating apparatus includes a third driven member rotatable about a third driven axis, a third driver member coupled to the third driven member for rotating the third driven member about the third driven axis, and the aforementioned two degree-of-freedom positioning and manipulating apparatus mounted to the third driven member. The rotational axes of the first and second driven axes are generally perpendicular to the rotational axis of the third driven member.

According to another aspect, the third driven member includes a generally cylindrical body or sector thereof.

In accordance with another aspect, the third driver member is coupled to the third driven member by a cable means.

According to still another aspect, the first, second, and third driver axes receive rotary input from respective mechanical rotary power sources, and the third driven axis passes through the bodies of the mechanical rotary power sources for the second and third driver axes.

According to another aspect, a three degree-of-freedom measuring apparatus includes a first rotary drive, the first rotary drive having a generally cylindrical or sector thereof first driver member and a generally cylindrical first driven member. The first driver member is rotatable about a first driver axis and coupled to the first driven member whereby rotation of the first driver member rotates the first driven member about a first driven axis, the first driver axis and the first driven axis being generally parallel. The apparatus further includes the aforementioned 2 degree-of-freedom measuring apparatus, the 2 degree-of-freedom measuring apparatus being fixedly connected to the driver member, whereby the rotational axis of the driver member is generally perpendicular to the rotational axes of the rotary drive members in the 2 degree-of-freedom measuring apparatus. A measuring means is coupled to the first driven member.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 shows a high performance 2 degree-of-freedom manipulator of prior art;

FIG. 2 shows a perspective view of a high performance 3 degree-of-freedom manipulator of prior art;

FIG. 8 shows a side view of a 3 degree-of-freedom manipulator of FIG. 6 according to the invention;

FIG. 9 shows a section view of a 3 degree-of-freedom manipulator of FIG. 8 according to the invention.

DETAILED DESCRIPTION OF THE INVENTION

The construction and benefits of a two degree-of-freedom manipulator as shown in FIG. 1 is described in related U.S. Pat. No. 5,429,015. With its scarcity and simplicity of components, this 2 degree-of-freedom mechanism offers high performance and economical construction. The motors do not move relative to the motion of the driven drums, so there is no performance penalty for using large motors to achieve rapid accelerations. No belts, chains, or linkages are required to transmit motor torques to the moving members. No additional transmission reduction mechanism is required. The short mechanical distance from motor to the controlled output point allows higher accelerations, more accurate positioning, and more accurate force and torque than competing designs. This design is well suited for applications that require fast and accurate planar motion, as in a SCARA (selective compliance articulated robot arm) industrial robot.

Figure 3:
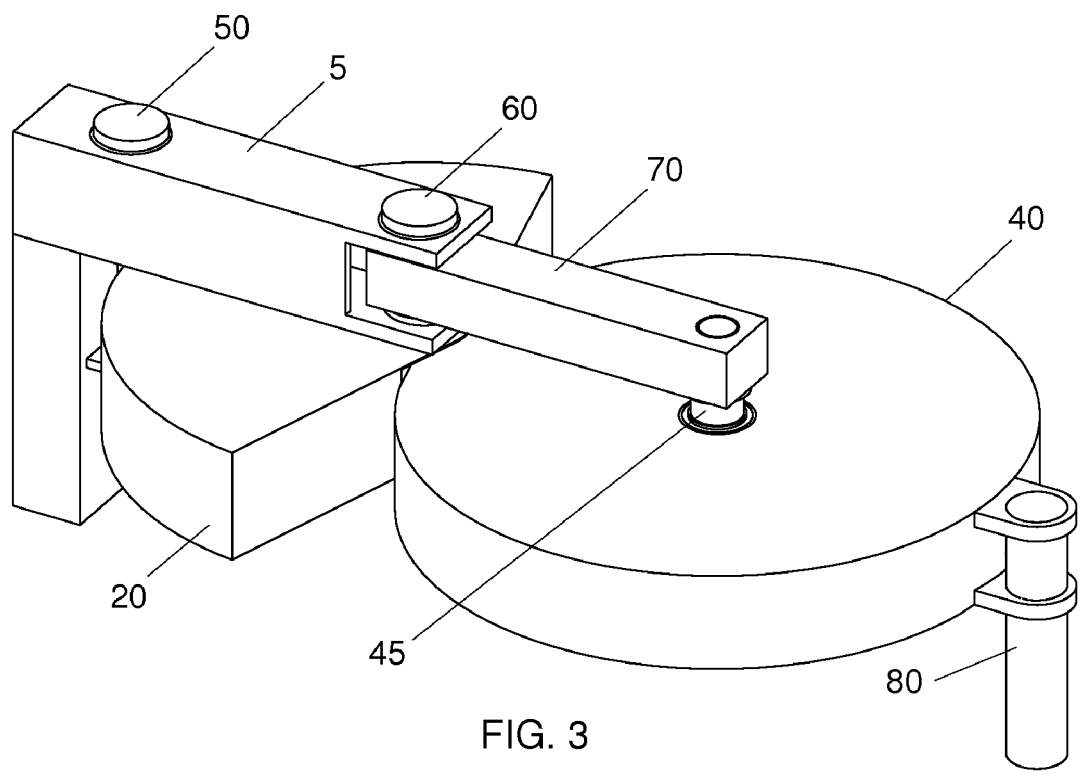
FIG. 3 shows a perspective view of a 2 degree-of-freedom manipulator according to the invention.
Figure 4:
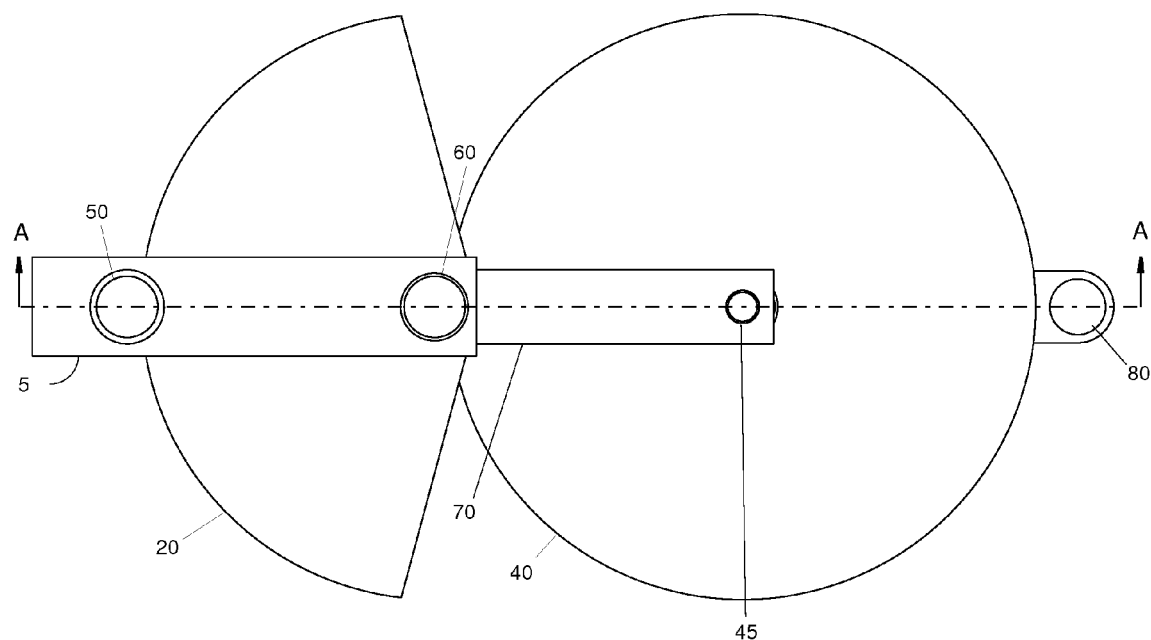
FIG. 4 shows a top view of a 2 degree-of-freedom manipulator of FIG. 3 according to the invention.
Figure 5:
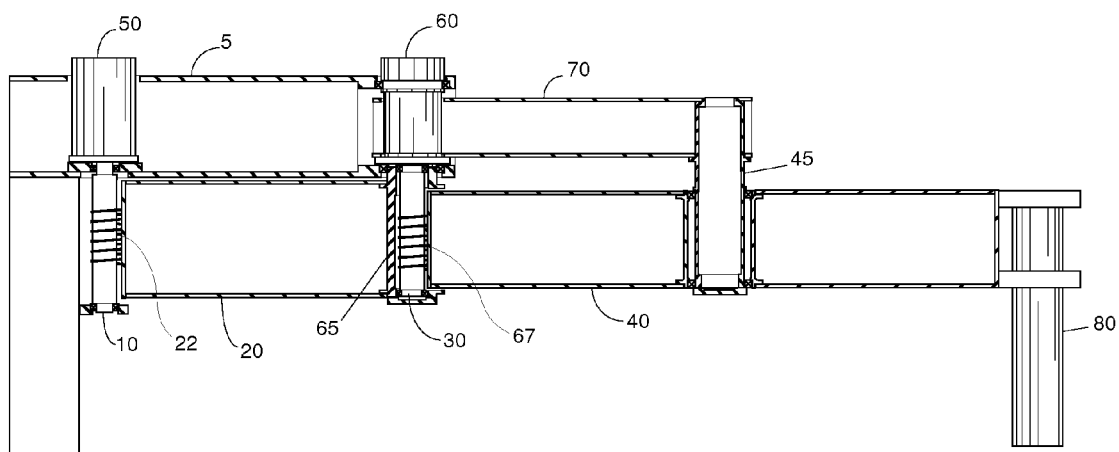
FIG. 5 shows a section view of a 2 degree-of-freedom manipulator of FIG. 4 according to the invention.

FIGS. 3-5 show a selective compliance articulated robot arm (SCARA) in an exemplary embodiment of the present invention. Drive motor 50 is mounted to stationary stand member 5. It turns a cylindrical driver capstan 10. The capstan 10 is coupled to driven drum 20 by cables 22. The larger relative diameter of the drum 20 over the capstan 10 produces a mechanical advantage for the motor 50. This rotary drive is known by the trademark name ROTO-LOK of Sagebrush Technology, Inc. Unlike the driven drums in the prior art of FIG. 1, drum 20 is not completely circular, but only describes a sector preferably less than one-half (½) of a complete circle. The arc length need only be large enough to meet the achievable or necessary rotational range of the robot joint. Fabricating drum 20 with only the needed arc length reduces its mass and inertia. It also permits improvements related to the mounting of the second link.

Continuing to refer to FIGS. 3-5, drum 20 is fixed to hub 65. Mounted on bearings internal and concentric to the hub 65 is capstan 30. Capstan 30 is driven by motor 60 and is coupled via cables 67 to drum 40. A slot is cut in the hub 65 to provide clearance for drum 40 and to allow the cables 67 to pass through to the internally mounted capstan 30. The hub 65 serves the dual purpose of supporting drum 20 and capstan 30, minimizing component count and mass.

In the prior art configuration shown in FIG. 1, distally mounted drum 40 is offset both radially and axially from proximal drum 20. With drum 20 fabricated as a partial cylinder in accordance with the present invention as exemplified in FIGS. 3-5, drum 40 can be mounted with only a radial offset from drum 20. This shortens the distance from the stationary stand 5 to drum 40, increasing the stiffness of the supporting structures and reducing their masses.

Drum 40 is rotatably mounted to link member 70 via shaft 45. Link 70 is fixed to motor 60. Motor 60 is mounted and journaled for rotation to fixed structural frame member 5. Hub 65 is concentrically fixed to motor 60. Therefore drum 20, capstan 30, and motor 60 all share a common axis of rotation.

When motor 50 causes drum 20 to rotate, link 70, drum 40, motor 60, and capstan 30 will all turn about said common axis. Motor 60 can therefore drive drum 40 independent of the pose of drum 20. Link member 80 is fixed to the periphery of drum 40 for mounting an end effector or tool.

These improvements over the prior art create a 2 degree-of-freedom manipulator with less mass, fewer components, and less bending in the components. It retains the benefits from the prior art of minimizing inertia by mounting the relatively massive motors to a fixed structural member, while avoiding the mass, friction, and roughness associated with using auxiliary power transmission components to deliver torque to the distal link. The moving members can be fabricated very light in weight, yet be sufficiently stiff to support rapid motions and accurate positioning.

This configuration can be extended to 3 degrees of freedom by mounting it to a third rotary drive, as shown in FIGS. 6-9. In this arrangement, the distal link in the 2 degree-of-freedom mechanism does not require as much freedom of rotation as in the SCARA, so it is made as a partial circular sector to minimize mass and inertia.

For the 3 degree-of-freedom manipulator shown in FIGS. 6-9, components 10, 20, 22, 30, 40, 45, 50, 60, 65, 67, 70, and 80 perform the same functions as their respective components described in the 2 degree-of-freedom configuration of FIGS. 3-5.

The principle difference is that instead of mounting to fixed structural frame member 5, these assembled components are mounted to an orthogonal shaft 95 via brackets 72 and 75 (FIG. 9). The shaft 95 is mounted and journaled for rotation to fixed support member 5. Also fixed to shaft 95 is drum 90. Drum 90 is shaped as a partial cylindrical sector similar to drum 20, and is driven by motor 55. More particularly, capstan 85 is driven by motor 55 and is coupled via cables 87 to drum 90 in the same manner as previously described for the other joints. As drum 90 is driven, it causes the shaft 95 and 2 degree-of-freedom mechanism to rotate about the shaft 95 axis.

Figure 6:
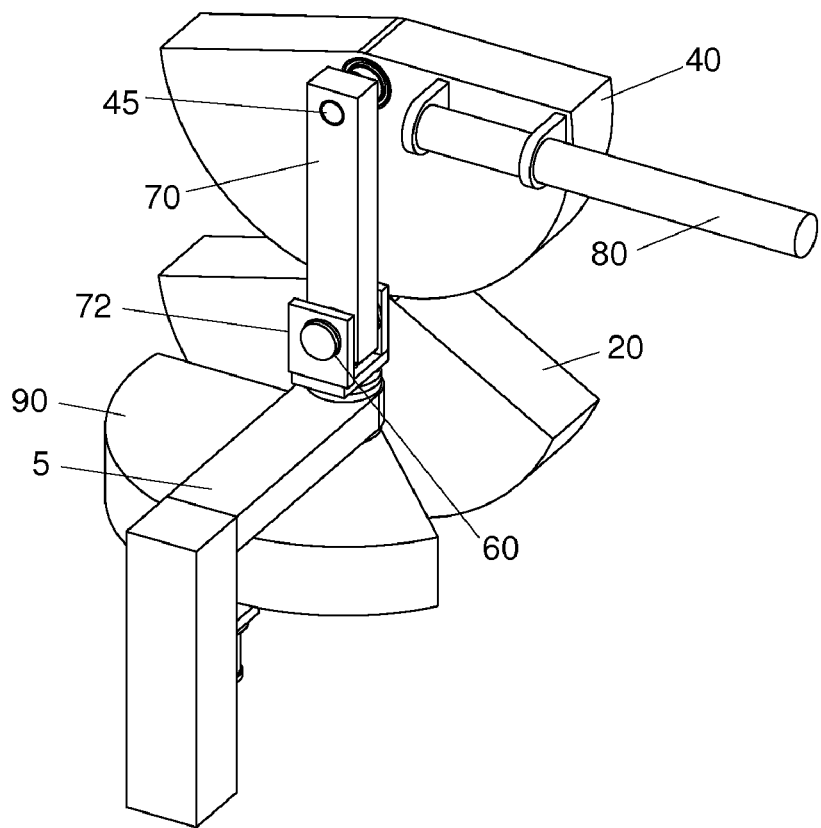
FIG. 6 shows a perspective view of a 3 degree-of-freedom manipulator according to the invention.
Figure 7:
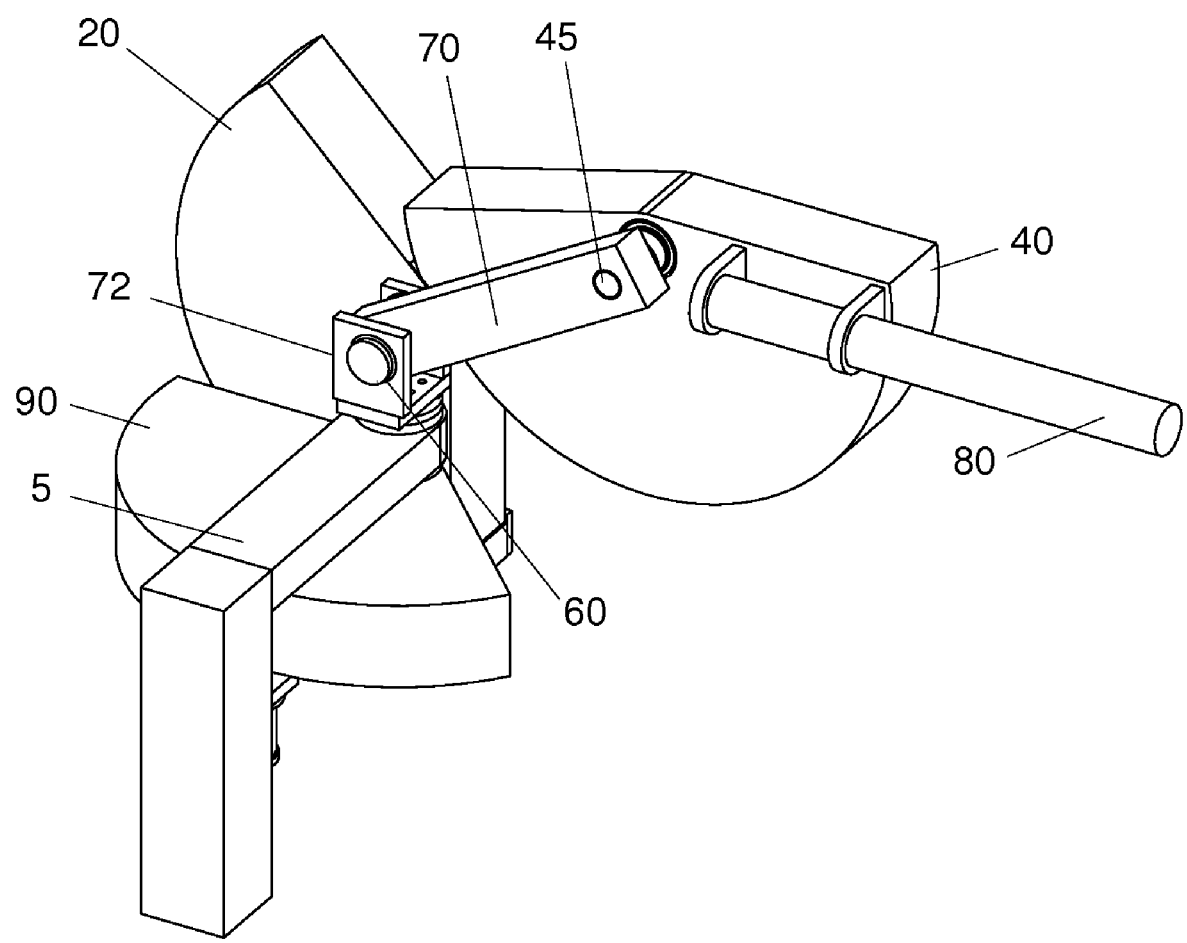
FIG. 7 shows a perspective view of a 3 degree-of-freedom manipulator of FIG. 6 with the arms in an altered pose.

The motors 50, 60 for the 2 degree-of-freedom mechanism are positioned directly along shaft 95's rotational axis to minimize their inertia. Also note that when the rotational axis of the shaft 95 is oriented vertically as shown in FIG. 6 and FIG. 7, drum 20 acts as a partial counterweight to the distal link. This reduces the torque required of motor 50 to offset gravity forces. This makes more torque available for the productive aspects of the manipulator, or allows a smaller motor for less inertia and increased dynamic responsiveness.

Compared to the prior art of FIG. 2, this 3 degree-of-freedom reduces the mass of the moving components and locates them closer to the perpendicular rotational axis for further inertia reduction. Lengths of support members are shortened, increasing structural and torsional rigidity. The mechanical path from the robot's end effector to the fixed support is shortened, increasing the robot's stiffness and accuracy. Less torque is required of the motors.

These improvements are made while maintaining the virtues in the prior art: 3 degrees-of-freedom with short, direct-drive style actuation of each joint while maintaining the benefits of a transmission reduction. It achieves practical levels of force output with minimal inertia, and smooth, low friction motion in an economical package.

Both the 2 degree-of-freedom apparatus of FIGS. 3-5 and the 3 degree-of-freedom apparatus of FIGS. 6-9 can be implemented as a coordinate measuring machine by replacing motors 50, 60, and in the case of the 3 degree-of-freedom apparatus, motor 55, with angular measurement sensors. A precision probe would be fixed at the end of member 80, and the operator would manually guide the probe to a desired measurement point. The coordinates of the point are calculated from the angles of the joints.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A two degree-of-freedom positioning and manipulating apparatus, comprising:
   a first driven member rotatable about a first driven axis;
   a first driver member coupled to the first driven member for rotating said first driven member about said first driven axis;
   a link member fixedly connected to said first driven member so as to rotate with the first driven member about the first driven axis;
   a second driven member rotatably mounted to said link member for rotating about a second driven axis, with said second driven axis generally parallel to said first driven axis; and
   a second driver member coupled at a drive point to said second driven member for rotating said second driven member about said second driven axis,
   wherein said drive point is generally coincident with said first driven axis;
   said first driven member is a sector of a generally cylindrical body; and
   said second driven member comprises a generally cylindrical body or sector thereof.

2. The apparatus of claim 1, wherein said first driven axis and said second driven axis are offset and generally parallel.

3. The apparatus of claim 1, wherein the first and second driver members each receive a respective rotary input from a respective mechanical rotary power source.

4. The apparatus of claim 3, further including a fixed reference frame, and wherein the first mechanical rotary power source is mounted stationary to said fixed reference frame.

5. The apparatus of claim 4, wherein the second mechanical rotary power source is mounted stationary relative to the rotation of the first driven member.

6. The apparatus of claim 4, wherein the rotating component of the second mechanical rotary power source is rotatably mounted to said fixed reference frame relative to the rotation of the first driven member.

7. The apparatus of claim 3, further comprising an arm fixedly secured to said second driven member.

8. The apparatus of claim 1, wherein said first driver member is coupled to said first driven member by a first cable means and said second driver member is coupled to said second driven member by a second cable means.

9. The apparatus of claim 8, wherein the first and second driver members each receive a respective rotary input from a respective mechanical rotary power source.

10. The apparatus of claim 9, further including a fixed reference frame, and wherein a rotating component of each mechanical rotary power source is rotatably mounted to said fixed reference frame relative to the rotation of the first driven member.

11. The apparatus of claim 10, wherein said first driver axis and said second driver axis are generally coplanar.

12. A three degree-of-freedom positioning and manipulating apparatus, comprising:
   a third driven member rotatable about a third driven axis;
   a third driver member coupled to said third driven member for rotating said third driven member about said third driven axis;
   the apparatus of claim 1, mounted to said third driven member; wherein the rotational axes of the said first and second driven axes are generally perpendicular to the rotational axis of said third driven member.

13. The apparatus of claim 12, said third driven member comprising a generally cylindrical body or sector thereof.

14. The apparatus of claim 13 wherein said third driver member is coupled to said third driven member by a cable means.

15. The apparatus of claim 12, wherein said first, second, and third driver axes receive rotary input from respective mechanical rotary power sources, and the third driven axis passes through the bodies of said mechanical rotary power sources for said second and third driver axes.

16. The apparatus of claim 12, said third driven member comprising a partial cylindrical body having an arc-shaped outer surface.

17. A two degree-of-freedom measuring apparatus, comprising:
   a first rotary drive comprising a generally cylindrical first driven member and a generally cylindrical sector first driver member, said first driver member being rotatable about a first driver axis and coupled to said first driven member whereby rotation of said first driver member rotates said first driven member about a first driven axis, said first driver axis and said first driven axis being generally parallel; and
   a second rotary drive comprising a generally cylindrical second driven member and a second driver member shaped generally as a cylinder or sector thereof, said second driver member being rotatable about a second driver axis and coupled to said second driven member whereby rotation of said second driver member rotates said second driven member about a second driven axis, said second driver axis and said second driven axis being generally parallel,
   wherein the second driver member is rotatably mounted to a link fixed to the first driver member for rotation about said second driver axis, said first driver axis and said second driver axis being offset and generally parallel, and said second driven axis being generally coincident with said first driver axis;
   a first measuring means coupled to said first driven member; and
   a second measuring means coupled to said second driven member.

18. A three degree-of-freedom measuring apparatus, comprising:
   a third rotary drive;
   said third rotary drive comprising a generally cylindrical or sector thereof third driver member and a generally cylindrical third driven member, said third driver member being rotatable about a third driver axis and coupled to said third driven member whereby rotation of said third driver member rotates said third driven member about a third driven axis, said third driver axis and said third driven axis being generally parallel;
   a 2 degree-of-freedom measuring apparatus as in claim 17, wherein said 2 degree-of-freedom measuring apparatus is fixedly connected to said third driver member; whereby the rotational axis of said third driver member is generally perpendicular to the rotational axes of the rotary drive members in said 2 degree-of-freedom measuring apparatus
   a measuring means coupled to said third driven member.

19. A two degree-of-freedom positioning and manipulating apparatus, comprising:
   a first driven member rotatable about a first driven axis;
   a first driver member coupled to the first driven member for rotating said first driven member about said first driven axis;
   a link member fixedly connected to said first driven member so as to rotate with the first driven member about the first driven axis;
   a second driven member rotatably mounted to said link member for rotating about a second driven axis, with said second driven axis generally parallel to said first driven axis; and
   a second driver member coupled at a drive point to said second driven member for rotating said second driven member about said second driven axis,
   wherein said drive point is generally coincident with said first driven axis, and
   said second driven member is generally coplanar with said first driven member.

20. A two degree-of-freedom positioning and manipulating apparatus, comprising:
   a first driven member rotatable about a first driven axis;
   a first driver member coupled to the first driven member for rotating said first driven member about said first driven axis;
   a link member fixedly connected to said first driven member so as to rotate with the first driven member about the first driven axis;
   a second driven member rotatably mounted to said link member for rotating about a second driven axis, with said second driven axis generally parallel to said first driven axis;
   a second driver member coupled at a drive point to said second driven member for rotating said second driven member about said second driven axis, wherein said drive point is generally coincident with said first driven axis;

wherein the first driven member is a partial cylindrical body having an arc-shaped outer surface; and said second driven member comprises a generally cylindrical body or partial cylindrical body having an arc-shaped outer surface.

21. A two degree-of-freedom positioning and manipulating apparatus, comprising:

a first driven member rotatable about a first driven axis;

a first driver member coupled to the first driven member for rotating said first driven member about said first driven axis;

a link member fixedly connected to said first driven member;

a second driven member rotatably mounted to said link member for rotating about a second driven axis, with said second driven axis generally parallel to said first driven axis; and a second driver member coupled at a drive point to said second driven member for rotating said second driven member about said second driven axis, wherein said drive point is generally coincident with said first driven axis, wherein said first driven member is a sector of a generally cylindrical body; and said second driven member comprises a generally cylindrical body or sector thereof.

22. A three degree-of-freedom positioning and manipulating apparatus, comprising:

a first driven member rotatable about a first driven axis;

a first driver member coupled to the first driven member for rotating said first driven member about said first driven axis;

a link member fixedly connected to said first driven member so as to rotate with the first driven member about the first driven axis;

a second driven member rotatably mounted to said link member for rotating about a second driven axis, with said second driven axis generally parallel to said first driven axis;

a second driver member coupled at a drive point to said second driven member for rotating said second driven member about said second driven axis, wherein said drive point is generally coincident with said first driven axis;

a third driven member mounted to any one of the link member, the first or second driver members, or the first or second driven members and rotatable about a third driven axis; and a third driver member coupled to said third driven member for rotating said third driven member about said third driven axis, wherein the rotational axes of the said first and second driven axes are generally perpendicular to the rotational axis of said third driven member, and said third driven member comprises a partial cylindrical body having an arc-shaped outer surface.

* * * * *